July 15, 1969     F. SIROLA     3,455,001
CUT-OFF TOOL
Filed Aug. 2, 1968     2 Sheets-Sheet 2
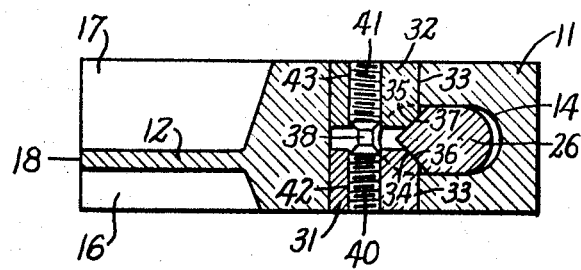
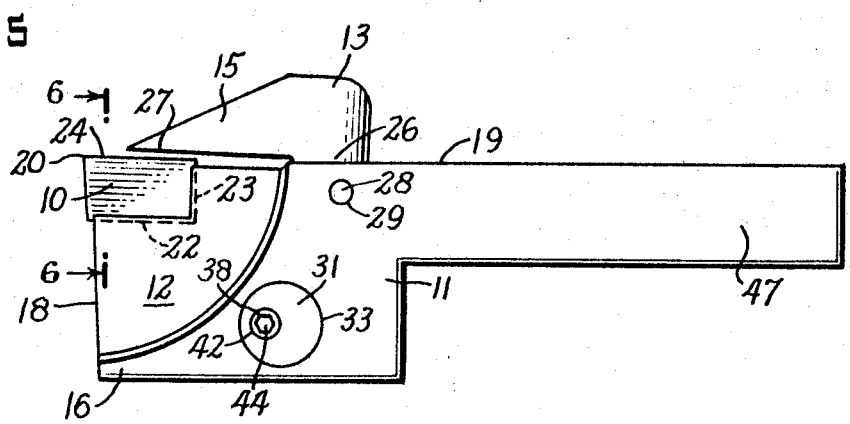
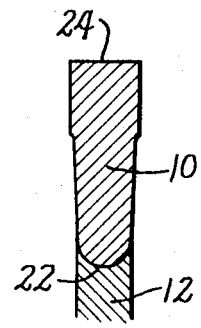

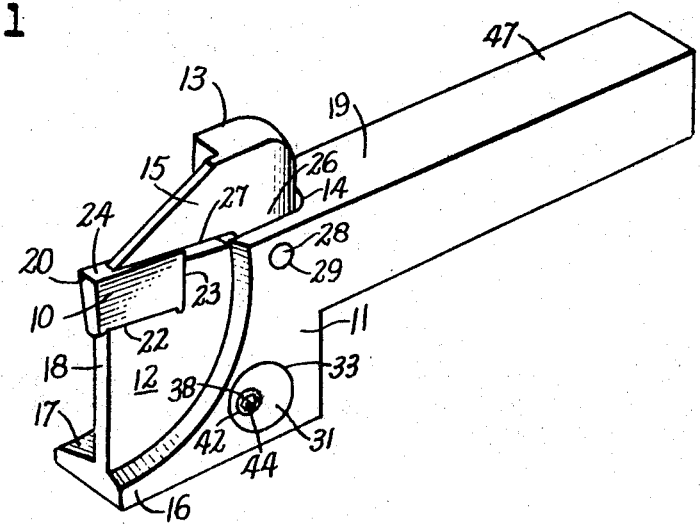
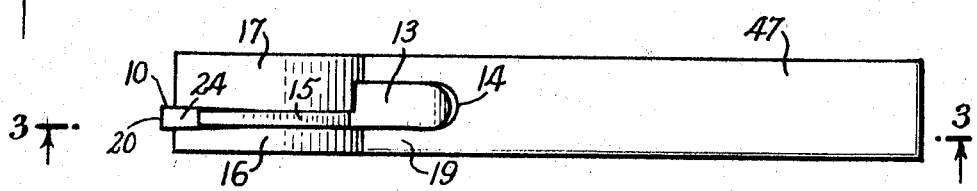
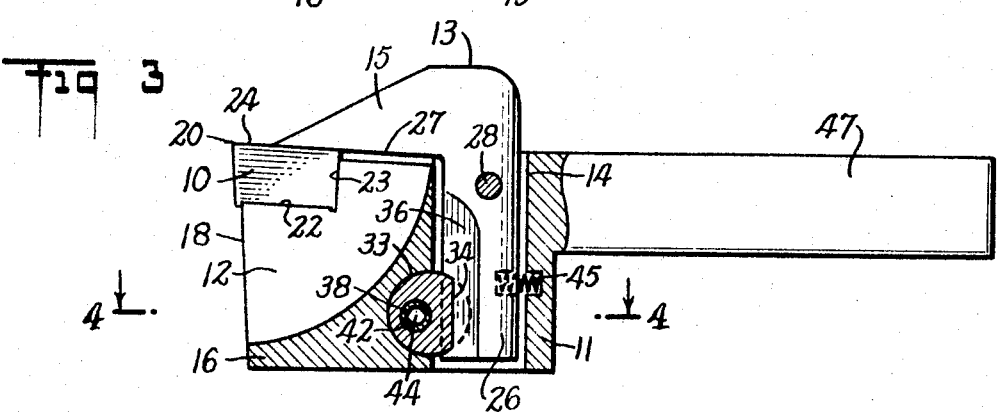

United States Patent Office 3,455,001
Patented July 15, 1969

3,455,001
CUT-OFF TOOL
Frank Sirola, % Aloris Tool Co., Inc., 419 Getty Ave., Clifton, N.J. 07011
Filed Aug. 2, 1968, Ser. No. 749,703
Int. Cl. B26d 1/00, 3/16
U.S. Cl. 29—96                                    5 Claims

ABSTRACT OF THE DISCLOSURE

The invention comprehends a cut-off tool which includes a holder having a forwardly directed narrow web portion provided with a seat for a carbide cutter element and with means for pivotally mounting a clamping member having a forwardly directed arm adapted to be moved into clamping engagement with said cutter element by means of camming members slidably mounted in said holder and manually actuated for effecting camming actions of said members against said clamping member. The camming members are mounted on a screw shaft having right and left hand threaded portions which threadedly engage said members for movement of said members toward and away from each other for effecting movement of said clamping members in opposite directions.

---

This invention relates generally to cutting tools and has particular reference to a cut-off tool adapted to mount a carbide cutter element.

The invention has in view a cut-off tool adapted to be secured in the tool post of a lathe and the like for cutting off or facing stock being turned in the lathe.

An object of the invention is to provide a cut-off tool having improved means for securing the carbide cutter element in portion thereon which permits of the expeditious release of the cutter element for removal and replacement thereof.

Another object of the invention is to provide a cut-off tool of few parts and which includes a holder of solid or integral formation for mounting the carbide cutter element thereon and for mounting the tool in the tool post of a lathe.

Another object of the invention is to provide a cut-off tool of said character in which the holder includes a forwardly disposed narrow web which is recessed at its forward upper end so as to mount a carbide cutter element thereon and with the holder provided with a clamping member which is pivoted thereto for movement toward and away from the cutter element for securing the cutter element on said web and for the release and replacement thereof.

Another object of the invention is the provision of a holder of integral formation which includes said narrow web together with a shank for mounting the tool in a tool post of a lathe and the like and with apertured means for receiving the clamping member to thereby preclude any movement of the web with reference to the shank so as to prevent chattering of the forward end of the tool during cutting operations.

Another object of the invention is the provision of camming members against which a cam faced portion of the clamping member is resiliently tensioned and which camming members are manually turned for releasably clamping said clamping member against said cutter element for securing the cutter element in operative position on said web.

With the foregoing and other objects in view, reference is now made to the following specification and accompanying drawings.

In the drawings:
FIG. 1 is a perspective view of a cut-off tool constructed in accordance with the invention;
FIG. 2 is a top plan view of the cut-off tool on a slightly enlarged scale;
FIG. 3 is a longitudinal sectional view taken approximately on line 3—3 of FIG. 2;
FIG. 4 is an enlarged sectional view taken approximately on line 4—4 of FIG. 3;
FIG. 5 is a view in side elevation showing the clamping member released from engagement with the cutter element; and
FIG. 6 is an enlarged sectional view taken approximately on line 6—6 of FIG. 5.

Referring to the drawings, the cut-off tool is adapted to be mounted in the tool post of a lathe and the like for presenting a carbide cuter element 10 in forwardly directed relations for cutting off or facing a piece of work being turned in the lathe.

The tool includes a holder 11 having an upwardly and forwardly directed web 12 on which the cutter element 10 is secured by means of a clamping member 13 pivotally mounted in an aperture 14 in the holder for movement of the arm 15 of the clamping member into and out of clamping engagement with the cutter element.

The web 12 is of narrow formation throughout and is cut out of the stock of the holder to thereby provide flanges 16 and 17 on opposite side thereof which extend arcuately about the web from the forward end 18 thereof to the top face 19 of the holders. The flanges are generated on radii having centers located coincident with the extreme cutting tip 20 of the cutter element. The web is offset to one side of the longitudinal center line of the holder so that the flange 17 is relatively wider than the flange 16 whereby the cutter element may be presented close to the chuck of the lathe holding the stock to be cut. The flanges reinforce the inner portions of the web and permit a cut in the stock the full length of the radii of flanges 16 and 17.

The forward end 18 of the web extends outwardly and upwardly in angular relation and is recessed at its upper and forward end to provide a seat for the cutter element. The bottom and rear edges 22 and 23 defining said recess are longitudinally grooved or recessed for receiving the complementary shaped bottom and rear edges of the cutter element. The seat functions to tilt the cutter element so that its upper edge 24 is disposed in inclined relation and the cutting tip 20 is arranged forwardly of the web and is located at the highest point thereof. The cutting tip 20 is wider than the web and the remaining portions of the cutter element so that the cut in the stock is of sufficient width to receive the web.

The clamping member 13 is of angular formation including a tongue 26 depending from the inner end of said arm 15. The arm 15 is of a width corresponding to the width of the web and extends forwardly into overlying relation with the cutter element and with the under edge 27 thereof being inclined correspondingly to that of the upper edge 24 of the cutter element. The tongue 26 is disposed in the aperture 14 of the holder and is pivoted on a cross pin 28 anchored in openings 29 in the side walls of the aperture.

The tongue 26 is disposed in operative engagement with oppositely arranged cylindrical camming members 31 and 32 which are mounted in spaced relation in a cross bore 33 in said holder 11. The bore 33 communicates with the aperture 14 with the forward edge portion of the tongue projecting forwardly between and into camming engagement with said camming members. The said members are formed with confronting cam faces 34 and 35 which respectively engage against cam faces 36 and 37 formed on the forward edge portion of said tongue.

The camming members slidably fit the bore 33 and are moved inwardly and outwardly by means of a screw shaft 38 having a right hand threaded portion 40 at one end and a left hand threated portion 41 at the other which threadedly engage threaded openings 42 and 43 in said camming members respectively. The camming member 31 is provided with a socket 44 adapted to be engaged by a key for manually turning the screw shaft. Turning said shaft in one direction functions to slide the camming members inwardly toward each other whereby said tongue is cammed and swung rearwardly on the cross pin 28 to thereby move the arm 15 downwardly against the cutter element to securely retain the same in position on said seat as shown in FIGS. 1 and 3.

The clamping member 13 is tensioned by a spring 45 arranged in confronting sockets in said tongue and holder which functions to resiliently retain the tongue in camming engagement with said camming members. It will be understood that turning said screw shaft 38 by said key in the direction opposite to the foregoing functions to slide said camming members outwardly whereby the cam faces 34 and 35 are moved farther apart and the tongue 26 is swung forwardly by the tension of the spring 45 to thereby retain the cam faces of said tongue and camming members in engagement and swing the arm 15 upwardly so as to free the cutter element for removal and replacement thereof as shown in FIG. 5 of the drawings.

The holder 11 as hereinbefore described is preferably of integral formation including said web 12 and means for mounting said clamping member 13 together with an elongated shank 47 for mounting the tool in a tool post of a lathe. This construction prevents relative movement of the web which supports the cutter element. The cutter element preferably consists of carbide material which is relatively inexpensive and is replaced when worn.

The screw shaft 38 is offset to one side of the center line through the camming members 31 and 32 as shown in FIGS. 3 and 4 of the drawings whereby the camming members move inwardly and outwardly with the manual turning of the screw shaft 38 without imparting turning movement to said members. It will be understood that slight turning of the screw shaft to the right will effect sufficient camming movement of said camming members toward each other for tightening the arm 15 against said cutter element 10, to hold the same in operative position on the web 12 and slight turning of the screw shaft to the left will effect release of said arm.

What is claimed is:

1. A cut-off tool of the character described including an apertured holder comprising a shank for mounting said tool in a support and a forwardly directed web of narrow formation having a recess in its forward end providing a seat, a cutter member on said seat, a clamping member including an arm and an angularly disposed tongue, said tongue being disposed in said aperture in the holder and being pivoted for swinging movement of said clamping member for disposing said arm in overlying clamping engagement with the cutter element positioned on said seat, camming members mounted in said holder in engagement with said tongue and screw means engaging said camming members and adapted to be manually actuated for camming said tongue to swing on its pivotal connection to thereby swing said arm into clamping engagement with said cutter element for securing the same in position on said seat.

2. A cut-off tool as set forth in claim 1, in which the web is integral with said shank and is formed from the body of the holder to provide flanges on opposite sides thereof extending along the bottom edge of said web and said camming members have cam faces disposed in engagement with cooperative faces on said tongue, and said screw means includes a screw shaft arranged in threaded engagement with said camming members for effecting sliding movement of said camming members for camming said tongue by manually actuating said screw shaft.

3. A cut-off tool as set forth in claim 2, in which said screw shaft is formed with right and left hand threaded portions which portions threadedly engage said camming members respectively whereby turning of said screw shaft in one direction effects sliding movement of said camming members for camming said arm of said clamping member into clamping engagement with said cutter element.

4. A cut-off tool as set forth in claim 1, in which said camming members are slidably mounted in an opening in said holder and have cam faces disposed in engagement with co-operative faces on said tongue, and said screw means being formed with right and left hand threaded portions which threadedly engage threaded openings in said camming members respectively and which screw means when turned in one direction effects sliding of said camming members toward each other to thereby cam said clamping member to dispose the arm thereof against said cutter element and when said screw means is turned in a direction opposite to said one direction effects movement of said camming members away from each other to thereby free said arm from clamping relation with said cutter element.

5. A cut-off tool as set forth in claim 4, in which the tongue of said clamping member is tensioned into engagement with the cam faces of camming members by spring means arranged in said aperture in the holder and positioned against said tongue and the body of the holder.

References Cited

UNITED STATES PATENTS

| 1,104,980 | 7/1914 | Fry | 29—96 |
| 1,306,039 | 6/1919 | Tufts | 29—96 |
| 1,484,332 | 2/1924 | Jaques | 29—96 |
| 3,158,921 | 1/1964 | Yost | 29—96 |

FOREIGN PATENTS

| 989,133 | 4/1965 | Great Britain. |
| 607,417 | 8/1948 | Great Britain. |
| 568,876 | 4/1945 | Great Britain. |

HARRISON L. HINSON, Primary Examiner